US006623128B2

(12) United States Patent
Kan

(10) Patent No.: US 6,623,128 B2
(45) Date of Patent: Sep. 23, 2003

(54) APPARATUS FOR FIXING AN OPTICAL SYSTEM

(75) Inventor: Woo-Young Kan, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 10/216,184

(22) Filed: Aug. 12, 2002

(65) Prior Publication Data

US 2003/0112416 A1 Jun. 19, 2003

(30) Foreign Application Priority Data

Dec. 17, 2001 (KR) .................................... 2001-0079996

(51) Int. Cl.[7] .............................................. G03B 21/22
(52) U.S. Cl. ............................ 353/74; 353/100; 353/15
(58) Field of Search ........................... 353/15, 100, 119, 353/74; 352/34, 35, 242

(56) References Cited

U.S. PATENT DOCUMENTS 4,174,157 A * 11/1979 Gottschalk ................... 352/35
5,037,195 A * 8/1991 Denny Clairmont et al. . 352/35

* cited by examiner

*Primary Examiner*—Russell Adams
*Assistant Examiner*—Michelle Nguyen
(74) *Attorney, Agent, or Firm*—Sughrue Mion, PLLC

(57) ABSTRACT

An apparatus for fixing an optidal system for use in a projection display device having a cabinet forming a casing and an optical system disposed on the cabinet for forming an image and magnifying and projecting the image. The apparatus includes a bracket for mounting the optical system; a first connector having projections formed at either one side portion of the bracket or a first counter-portion of the cabinet opposite to the one side portion of the bracket, projection-receiving parts formed at the other of the one side portion of the bracket or the first counter-portion of the cabinet, and first vibration-absorbing members for absorbing vibrations from the cabinet disposed between the projection and the projection-receiving part; and a second connector having a second vibration-absorbing member for absorbing the vibrations from the cabinet interposed between the other side portion of the bracket and a second counter-portion of the cabinet opposite to the other side portion of the bracket, and an intermediate fixing member having a portion directly fixed to the second counter-portion of the cabinet and another portion disposed to be in contact with the second vibration-absorbing member to press it against the other side portion of the bracket.

7 Claims, 3 Drawing Sheets

APPARATUS FOR FIXING AN OPTICAL SYSTEM

BACKGROUND OF THE INVENTION

1. Field of the Invention

The present invention relates to a projection display device such as a projection television, and more particularly to an apparatus for fixing an optical system for use in a projection display device which can absorb vibrations from a cabinet which secures and supports the optical system, the vibrations being caused, for example, by an increase in the audio output of speakers associated with the projection display device, thereby preventing the optical system from vibrating or shaking, and ultimately preventing the images and/or pictures generated by the optical system from vibrating or shaking. The present application is based on Korean Patent Application No. 2001-79996, filed Dec. 17, 2001, which is incorporated herein by reference.

2. Description of the Related Art

A projection display device such as a projection television is an apparatus of a type which generates an image or a picture through liquid crystal display (LCD) elements and the like, and then magnifies and projects or images the image or picture on a large-sized screen through a projection lens. Because the large picture of the projection television is satisfying to the consumer, the demand for projection televisions is increasing.

As schematically shown in FIG. 1, a general projection television comprises an optical system 30 disposed on a cabinet 20 in a lower part of casing 10 to selectively transmit light beams generated from a light source through LCD elements, thereby to generate an image and to magnify and project it through a projection lens, a reflecting mirror 40 mounted slantingly at a given angle on an upper part of the rear side of the casing 10 to reflect the image magnified through the optical system 30 toward the front, and a screen 50 disposed at an upper part of the front side of the casing 10 facing the outside of the television so as to transmit or image the image reflected from the reflecting mirror 40.

Due to the critical nature of the operation of the optical system 30 for forming and magnifying an image in the projection television, even a small change in the position of the optical system 30 can have a large effect on the picture which is formed on the screen 50. Accordingly, to prevent the position of the optical system 30 from changing when the projection television is transported or moved, the optical system 30 is fixed to the cabinet 20 forming the casing 10 by means of an apparatus 60 for fixing the optical system 30.

As shown in FIG. 1, the apparatus 60 for fixing the optical system 30 comprises a bracket 62 for supporting and mounting the optical system 30 having a hanger 64 horizontally protruding from a lower part of one side thereof and a fixed end 66 protruding downwardly from the other side thereof, a hanger-receiving groove 22 formed at a portion of the cabinet 20 opposite to the hanger 64 of the bracket 62 to receive it, and screws 68 for fixing the fixed end 66 of the bracket 62 to a portion of the cabinet 20 opposite thereto. On the bracket 62, the optical system 30 is fixed by means of screws and the like. Generally, the optical system 30 is composed of a main projecting part 32 having a lamp, cathode ray tube mirrors for respectively reflecting red, green and blue beams constituting three primary colors from light emitted from the lamp, a LCD panel for forming a desired image by combining the beams reflected from the respective cathode ray tube mirrors, and a projecting lens for magnifying the image formed on the LCD panel, a circuit substrate part 34 for controlling the components such as the lamp, the LCD panel and the like of the main projecting part 32, and a power supplying part 36, such as a transformer, for supplying electric power to the circuit substrate part 34.

Thus, in the conventional apparatus 60 for fixing the optical system 30, the bracket on which the optical system 30 is mounted is fixed to the cabinet 20 by first inserting the hanger 64 into the hanger-receiving groove 22 and then screwing the fixed end 66 thereto, so that the optical system 30 is fixedly maintained in position, particularly in transporting or moving of the projection television.

However, in the projection television, since speakers 70 are installed on the cabinet 20, the conventional apparatus 60 for fixing the optical system 30 presents a phenomenon that the cabinet 20 together with the bracket 62 fixed thereon is trembled by vibrations of the speakers 70.

When the bracket 62 is vibrated by the vibrations of the speakers 70, the optical system 30 for forming the image and projecting it is in turn vibrated, thereby resulting in a vibration of the picture which is reflected through the reflecting mirror 40 from the optical system 30 to be imaged on or transmitted through the screen 50. Therefore, the ultimate picture of the projection television is vibrated. As a result, if the user controls the volume of sound produced by the speakers to be at a high level, the performance of the projection television deteriorates.

SUMMARY OF THE INVENTION

Therefore, it is an object of the present invention to provide an improved apparatus for fixing an optical system for use in a projection display device having a large picture and high tone quality, which can not only prevent the position of the optical system from varying during transporting or moving of the projection display device, but can also prevent the picture form vibrating or shaking as a result of a change or difference in the volume of sound produced by the speakers in the projection display device.

This and other objects are provided, according to the present invention, by an apparatus for fixing an optical system for use in a projection display device having a cabinet forming a casing, and an optical system disposed on the cabinet for forming an image and magnifying and projecting the image, comprising a bracket for mounting the optical system; a first vibration-absorbing connector having at least one projection formed at one among one side portion of the bracket and a first counter-portion of the cabinet opposite to the one side portion of the bracket, at least one projection-receiving part for receiving the projection formed at the other among the one side portion of the bracket and the first counter-portion of the cabinet, and at least one first vibration-absorbing member for absorbing vibrations from the cabinet disposed between the projection and the projection-receiving part; and a second vibration-absorbing connector for fixing the other side portion of the bracket to a second counter-portion of the cabinet opposite to the other side portion of the bracket, having a second vibration-absorbing member for absorbing the vibrations from the cabinet interposed between the other side portion of the bracket and the second counter-portion of the cabinet. Also, the second vibration-absorbing connector further includes an intermediate fixing member having a portion directly fixed to the second counter-portion of the cabinet by means of a fixing part, and another portion disposed to be in contact with the second vibration-absorbing member so as to press it against the other side portion of the bracket. Alternatively, the first vibration-absorbing connector can further include at least one elastic supporting member for preventing a direct contact between the one side portion of the bracket and the first counter-portion of the cabinet from being formed.

In a preferred embodiment, the first vibration-absorbing member is formed of a rubber tube formed to wrap the projection and having one end formed in the form of a hemisphere, and the second vibration-absorbing member is formed of a rubber plate attached to the other side portion of the bracket in a contact portion between the bracket and the intermediate fixing member. Also, it is preferable that the fixing part is formed of screws or rivets.

The intermediate fixing member is formed of a plate having at least two fixing protrusions for pressing and unmovably fixing the second vibration-absorbing member attached to the other side portion of the bracket, thereby to ensure that the position of the bracket does not vary when the intermediate fixing member presses the second vibration-absorbing member against the other side portion of the bracket.

Also, the intermediate fixing member has a datum part for guiding an assembling position. The datum part includes at least one datum projection formed on a portion of the intermediate fixing member being in contact with the other side portion of the bracket, and at least one datum projection-receiving part formed in a portion of the other side portion of the bracket opposite to the datum projection to receive the datum projection.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views.

DETAILED DESCRIPTION OF PREFERRED EMBODIMENTS

The present invention now will be described more fully hereinafter with reference to the accompanying drawings, in which a preferred embodiment of the invention is shown. Like numbers refer to like elements throughout.

Figure 1:
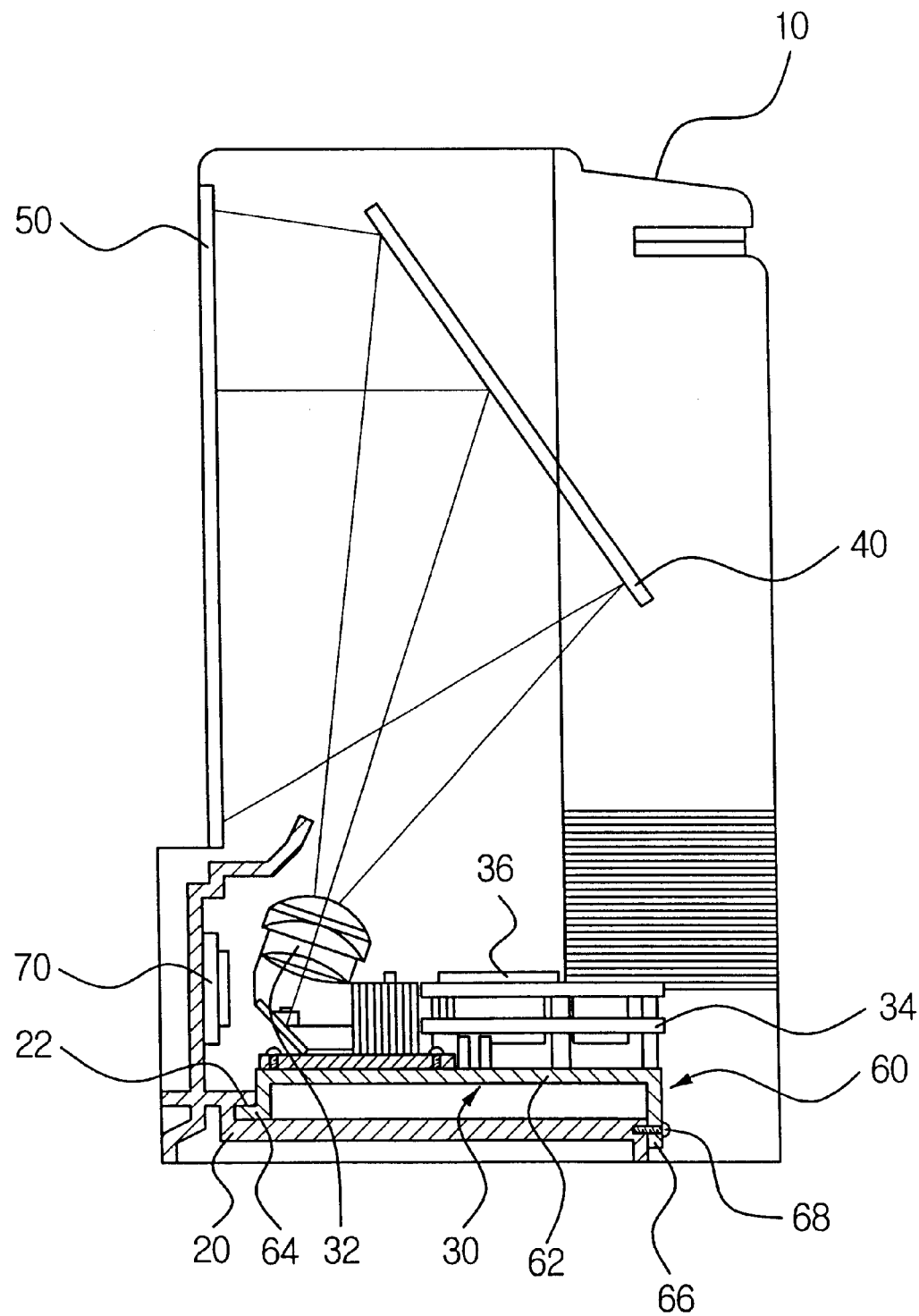
FIG. 1 is a schematic cross-sectional view of an apparatus for fixing an optical system in a conventional projection television.

A projection display device, which is applied to the preferred embodiment of the invention, is a general projection television of a kind as shown in FIG. 1. The projection television has an optical system 130 disposed on a cabinet 120 in a lower part of a casing (not shown) to generate an image and magnify and project it through a main projecting part 132 including a projection lens, a plurality of speakers 170 disposed on the cabinet 120 in the vicinity of the optical system 130, a reflecting mirror (not shown) for reflecting the image magnified through the optical system 130 toward the front, and a screen (not shown) for transmitting or imaging the image reflected from the reflecting mirror.

The optical system 130 is fixed to the cabinet 120 by means of an apparatus 100 for fixing the optical system 130 in accordance with the present invention, to prevent vibrations from being generated when the power output of the speakers is changed, for example, increased, as well as to prevent the position thereof from changing when the projection television is transported or moved.

Figure 2:
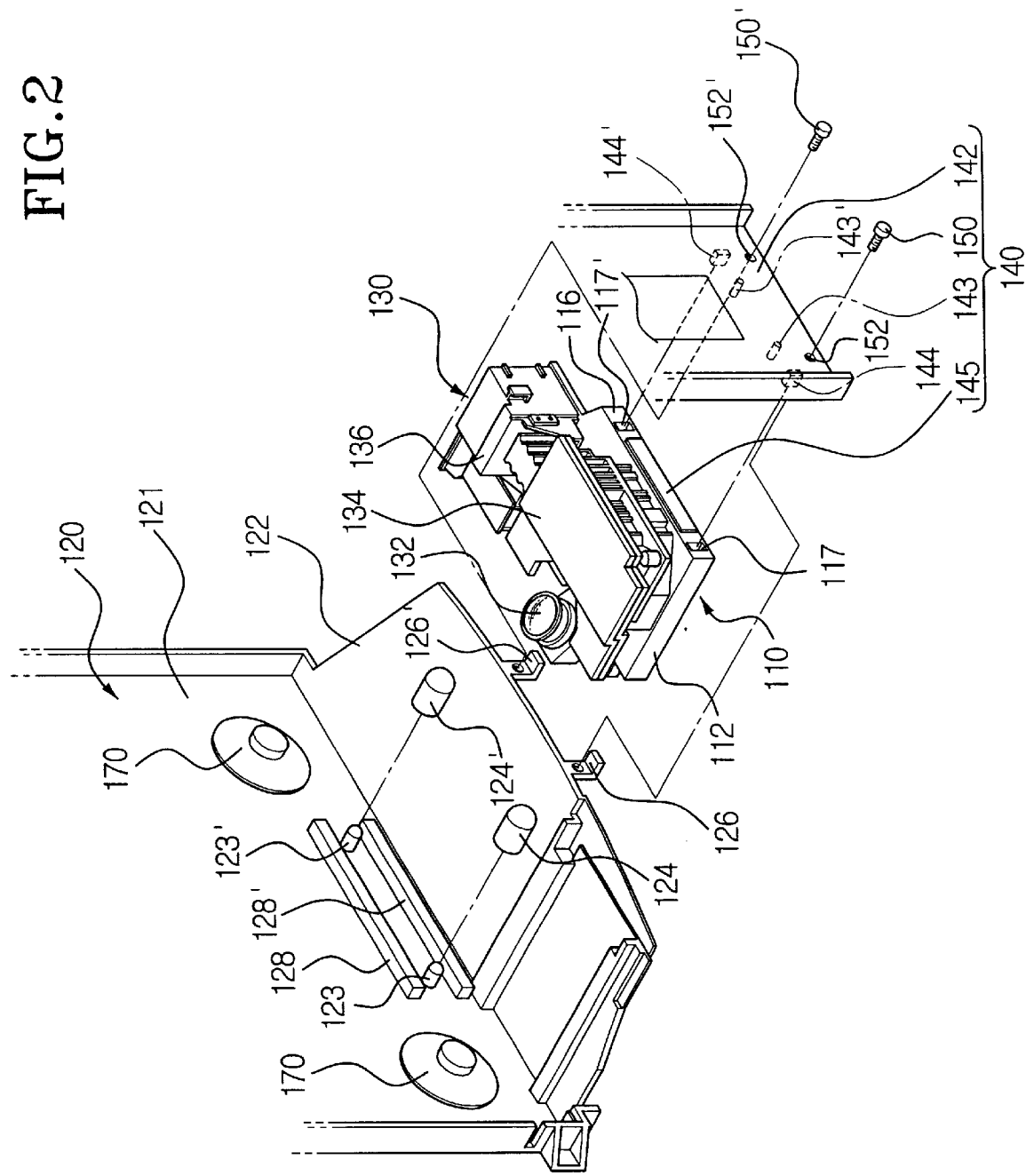
FIG. 2 is an exploded perspective view of an apparatus for fixing an optical system in accordance with a preferred embodiment of the present invention.
Figure 3:
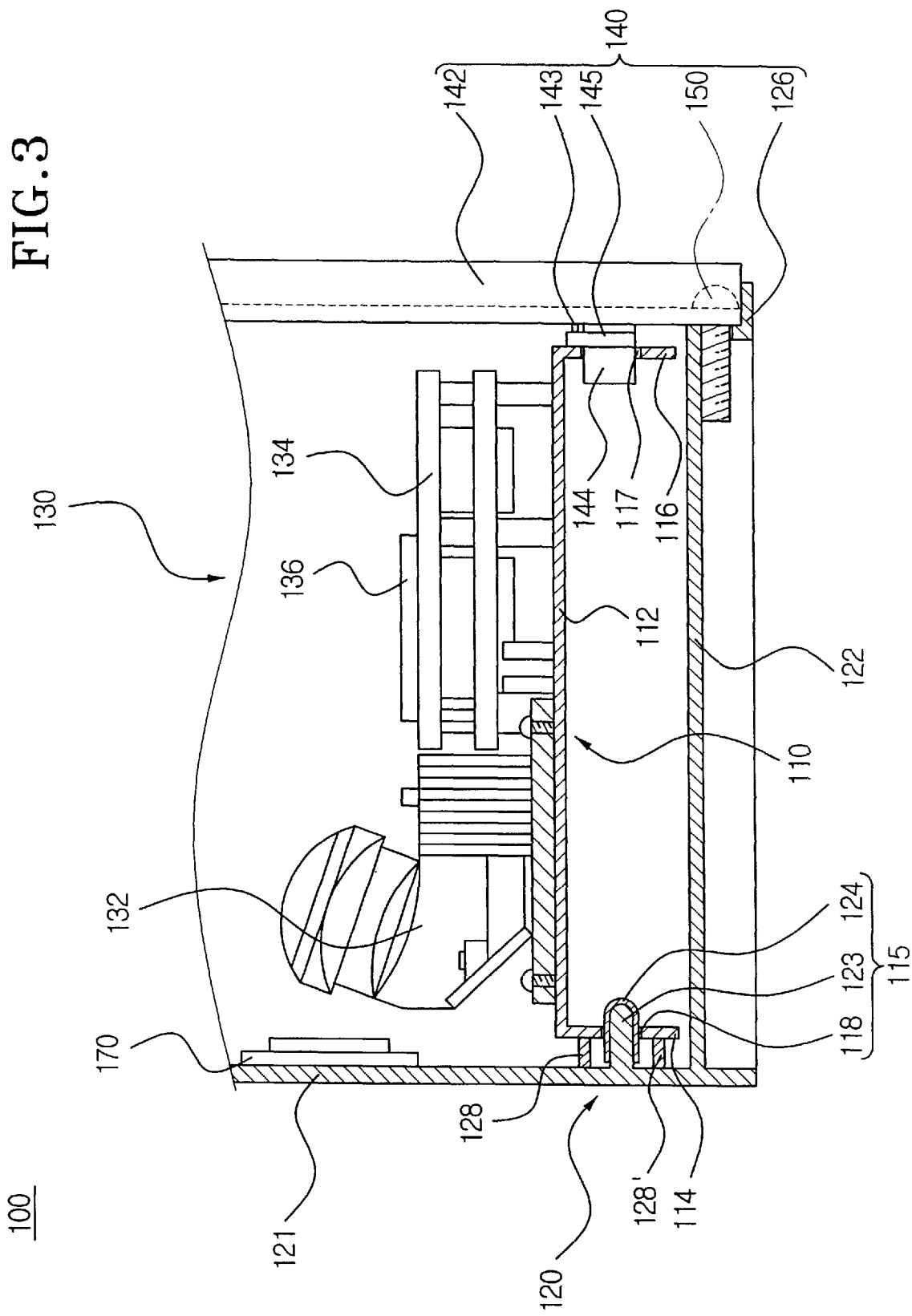
FIG. 3 is a side cross-sectional view of the apparatus for fixing the optical system shown in FIG. 2.

Referring now to FIG. 2 and FIG. 3, there is illustrated the apparatus 100 for fixing the optical system 130 in accordance with the present invention.

The apparatus 100 for fixing the optical system 130 of the invention comprises a supporting bracket 110 disposed on the cabinet 120, for mounting the optical system 130 which generates and projects the image, a first vibration-absorbing connector 115 (FIG. 3) for connecting or fixing one side end wall 114 of the bracket 110 to a first counter-portion of a vertical sidewall 121 of the cabinet 120 opposite to the one side end wall 114 in a socket-coupling manner, and a second vibration-absorbing connector 140 for fixing the other side end wall 116 of the bracket 110 to a second counter-portion of a bottom 122 of the cabinet 120 opposite to the other side end wall 116.

The supporting bracket 110 is composed of a supporting plate 112, and side end walls 114, 116 extending downwardly from an edge of the supporting plate 112. On the supporting plate 112, the main projecting part 132, a circuit substrate part 134, and a power supplying part 136 constituting the optical system 130 are mounted and fixed by screws and the like.

The first vibration-absorbing connector 115 is provided with first and second cylindrical projections 123, 123' formed in a spaced-apart relation with one another on the vertical sidewall 121 of the cabinet 120, first and second projection-receiving holes 118 formed in the one side end wall 114 of the bracket 110 to receive the first and second cylindrical projections 123, 123', and two first vibration-absorbing members 124, 124' for cushioning contacts between the first and second cylindrical projections 123, 123' and the first and second projection-receiving holes 118, respectively, disposed therebetween to absorb the vibrations generating from the vertical sidewall 121 of the cabinet 120.

It is preferable that the first vibration-absorbing members 124, 124' are formed of rubber tubes formed to wrap the first and second projections 123, 123' and having one end formed in the shape of a hemisphere, respectively.

Also, the first vibration-absorbing connector 115 includes elastic supporting members 128, 128' for preventing the one side end wall 114 of the bracket 110 from directly contacting the first counter-portion of the vertical sidewall 121 of the cabinet 120. The elastic supporting members 128, 128' are longitudinally disposed over and below the first and second projections 123, 123' on the vertical sidewall 121 of the cabinet 120, respectively. Alternatively, the elastic supporting members 128, 128' can be formed on the one side end wall 114 of the bracket 110 instead of the vertical sidewall 121 of the cabinet 120.

Here, it should be noted that in the embodiment described above, the first and second projections 123, 123' and the first and second projection-receiving holes 118 are described as being formed as cylindrical shapes and holes, respectively, but if necessary, they can be formed to have plate shapes and counter-grooves corresponding to the plate shapes, respectively. Also, the first and second projections 123, 123' and the first and second projection-receiving holes 118 can be designed to be formed on the one side end wall 114 of the bracket 110 and in the vertical sidewall 121 of the cabinet 120, instead of on the vertical sidewall 121 of the cabinet 120 and in the one side wall 114 of the bracket 110, respectively.

The second vibration-absorbing connector 140 has a second vibration-absorbing member 145 formed at the other side end wall 116 of the bracket 110 to absorb the vibrations from the bottom 122 of the cabinet 120, an intermediate fixing member 142 having a portion directly fixed to the cabinet 120 and another portion disposed to be in contact with the second vibration-absorbing member 145 to press it against the bracket 110, and first and second fixing parts 150, 150' such as screws or rivets for fixing the intermediate fixing member 142 to first and second fixing bracket 126, 126' formed at the cabinet 120 through first and second fixing holes 152, 152' in the intermediate fixing member 142.

The second vibration-absorbing member 145 is formed of a rectangle-shaped rubber plate attached to a surface or recess (not shown) of the other side end wall 116 of the bracket 110 between the intermediate fixing member 142 and the bracket 110.

The intermediate fixing member 142 is formed of a rectangular plate having first and second fixing protrusions 143, 143' for pressing and unmovably fixing the second vibration-absorbing member 145 attached to the other side end wall 116 of the bracket 110. When the intermediate fixing member 142 is fixed to the first and second bracket 126, 126' of the bottom 122 of the cabinet 120 by the first and second fixing parts 150, 150' to press the second vibration-absorbing member 145 against the other side end wall 116 of the bracket 110, the first and second fixing protrusions 143, 143' function to fixedly tie up the bracket 110 as well as the second vibration-absorbing member 145, thereby to ensure that the bracket 110 does not vary in position when the projection television is transported or moved.

Also, the intermediate fixing member 142 includes a datum part for guiding an assembling position during assembly. The datum part is composed of first and second datum projections 144, 144' formed at a lower part of the intermediate fixing member 142 being in contact with the other side end wall 116 of the bracket 110, and first and second projection-receiving holes 117, 117' formed at a portion of the other side end wall 116 of the bracket 110 opposite to the first and second datum projections 144, 144' to receive them. It is preferable that the first and second projection-receiving holes 117, 117' are formed in size larger than that of the first and second datum projections 144, 144' so as not to be in direct contact with them when the intermediate fixing member 142 is fixed to the first and second fixing bracket 126, 126'.

As described above, the apparatus 100 for fixing the optical system 130 of the present invention is constructed, such that when the bracket 110 on which the optical system 130 is mounted is fixed on the cabinet 120, the side end walls 114, 116 of the bracket 110 are not only fixedly secured to the vertical sidewall 121 and the bottom 122 of the cabinet 120 by the first and second projections 123, 123' and projection-receiving holes 118, and the intermediate fixing member 142 and the first and second fixing protrusions 143, 143', respectively, but also the vibrations generating from the vertical sidewall 121 and the bottom 122 of the cabinet 120 are completely absorbed through the first and second vibration-absorbing members 124, 124', 145. Accordingly, even though the power output of the speakers 170 is increased, the vibrations of the speakers 170 and the cabinet 120 caused by changes in volume are almost completely absorbed by the first and second vibration-absorbing members 124, 124', 145, and as a result these vibrations are not transmitted to the optical system 130.

A process for setting-up the apparatus 100 for fixing an optical system 130 in accordance with the present invention will now be described in detail with reference to FIG. 2 and FIG. 3.

First, a bracket 110 on which an optical system 130 is mounted is installed on the cabinet 120. At this time, first and second projection-receiving holes 118 formed in one side end wall 114 of the bracket 110 are aligned with first and second projections 123, 123' formed on a vertical sidewall 121 of a cabinet 120. Then, the first and second projections 123, 123' are wrapped in first vibration-absorbing members 124, 124', respectively.

At this time, the bracket 110 is pushed to ensure that the first and second projections 123, 123' are inserted into the first and second projection-receiving holes 118. As a result, the one side end wall 114 is positioned to be in contact with an elastic supporting member 128 of the vertical sidewall 121 of the cabinet 120.

After that, to position an intermediate fixing member 142 in an assembling position, first and second datum projections 144, 144' of the intermediate fixing member 142 are inserted respectively into first and second datum projection-receiving holes 117, 117'. At this time, a lower end of the intermediate fixing member 142 is disposed to be laid on first and second fixing brackets 126, 126' of a bottom 122 of the cabinet 120, and first and second fixing protrusions 143, 143' are maintained in a state of being in contact with a second vibration-absorbing member 145.

And then, the intermediate fixing member 142 is fixed to the first and second fixing brackets 126, 126' by being screwed with first and second fixing parts 150, 150' through first and second fixing holes 152, 152'. At this time, the first and second fixing protrusions 143, 143' press the second vibration-absorbing member 145 attached to the other side end wall 116 of the bracket 110, so that the bracket 110 is fixedly maintained in position without varying the position thereof.

Thus, setting-up the apparatus 100 of the present invention is simple and uncomplicated compared with the conventional apparatus.

As is apparent from the foregoing description, it can be appreciated that the apparatus for fixing the optical system of the present invention has an effect which can not only prevent the position of the optical system from changing when the projection display device is transported or moved, but can also prevent the picture from vibrating as a result of a change in the audio output of the projection display device, resulting in the device having a large picture of high quality.

In the drawings and specification, there have been disclosed a typical preferred embodiment of the invention and, although specific terms are employed, they are used in a generic and descriptive sense only and not for purpose of limitation, the scope of the invention being set forth in the following claims.

What is claimed is:

1. An apparatus for fixing an optical system for use in a projection display device, the display device having a cabinet forming a casing and the optical system disposed on the cabinet, the optical system for forming an image and magnifying and projecting the image, the apparatus comprising:

a bracket for mounting the optical system;

a first vibration-absorbing connector having at least one projection formed at one among one side portion of the bracket and a first counter-portion of the cabinet opposite to the one side portion of the bracket, at least one projection-receiving part for receiving the projection formed at the other among the one side portion of the bracket and the first counter-portion of the cabinet, and at least one first vibration-absorbing member for absorbing vibrations from the cabinet disposed between the projection and the projection-receiving part; and a second vibration-absorbing connector for fixing the other side portion of the bracket to a second counter-portion of the cabinet opposite to the other side portion of the bracket, having a second vibration-absorbing member for absorbing the vibrations from the cabinet interposed between the other side portion of the bracket and the second counter-portion of the cabinet.

2. The apparatus according to claim 1, wherein the second vibration-absorbing connector further includes an intermediate fixing member having a portion directly fixed to the second counter-portion of the cabinet by means of a fixing part, and another portion disposed to be in contact with the second vibration-absorbing member so as to press the second vibration-absorbing member against the other side portion of the bracket.

3. The apparatus according to claim 2, wherein the first vibration-absorbing connector further includes at least one elastic supporting member for preventing direct contact between the one side portion of the bracket and the first counter-portion of the cabinet.

4. The apparatus according to claim 2, wherein the first vibration-absorbing member includes a rubber tube formed to wrap the projection and having one end which is hemispherically shaped; and wherein the second vibration-absorbing member includes a rubber plate attached to the other side portion of the bracket at a contact portion between the bracket and the intermediate fixing member.

5. The apparatus according to claim 3, wherein the intermediate fixing member includes a plate having at least two fixing protrusions for pressing and unmovably fixing the second vibration-absorbing member attached to the other side portion of the bracket, thereby to ensure that a position of the bracket not change when the intermediate fixing member presses the second vibration-absorbing member against the other side portion of the bracket.

6. The apparatus according to claim 5, wherein the intermediate fixing member further includes a datum part for guiding an assembling position.

7. The apparatus according to claim 6, wherein the datum part includes, at least one datum projection formed on a portion of the intermediate fixing member being in contact with the other side portion of the bracket; and at least one datum projection-receiving part formed in a portion of the other side portion of the bracket opposite to the datum projection to receive the datum projection.

* * * * *